(12) United States Patent
Doering

(10) Patent No.: US 9,267,408 B2
(45) Date of Patent: Feb. 23, 2016

(54) METHOD FOR USE IN CONJUNCTION WITH AN EXHAUST-GAS AFTERTREATMENT SYSTEM

(71) Applicant: MAN Truck & Bus AG, Munich (DE)

(72) Inventor: Andreas Doering, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 13/853,527

(22) Filed: Mar. 29, 2013

(65) Prior Publication Data

US 2013/0255229 A1 Oct. 3, 2013

(30) Foreign Application Priority Data

Mar. 30, 2012 (DE) .......................... 10 2012 006 448

(51) Int. Cl.
| | |
|---|---|
| *F01N 3/00* | (2006.01) |
| *F01N 3/08* | (2006.01) |
| *F01N 3/20* | (2006.01) |
| *F01N 3/023* | (2006.01) |
| *F01N 13/00* | (2010.01) |

(Continued)

(52) U.S. Cl.
CPC .............. *F01N 3/08* (2013.01); *B01D 53/9477* (2013.01); *F01N 3/0231* (2013.01); *F01N 3/208* (2013.01); *F01N 13/009* (2014.06); *F02D 41/029* (2013.01); *F02D 41/0275* (2013.01); *F02D 41/3836* (2013.01); *F02D 41/401* (2013.01); *B01D 53/944* (2013.01); *B01D 53/9418* (2013.01); *B01D 2251/2062* (2013.01); *B01D 2255/20723* (2013.01); *B01D 2255/50* (2013.01); *B01D 2255/911* (2013.01); *B01D 2255/9155* (2013.01); *B01D 2258/012* (2013.01); *Y02T 10/24* (2013.01); *Y02T 10/44* (2013.01)

(58) Field of Classification Search
USPC ........... 60/274, 286, 395, 297, 301, 303, 295, 60/311
See application file for complete search history.

(56) References Cited

U.S. PATENT DOCUMENTS

| | | | |
|---|---|---|---|
| 7,316,157 B2* | 1/2008 | Ohsaki ........................ | 73/114.69 |
| 8,041,498 B2* | 10/2011 | Brown et al. ................. | 701/103 |

(Continued)

FOREIGN PATENT DOCUMENTS

| | | |
|---|---|---|
| DE | 34 28 232 A1 | 2/1986 |
| DE | 40 38 054 A1 | 6/1992 |

(Continued)

*Primary Examiner* — Binh Q Tran
(74) *Attorney, Agent, or Firm* — Lucas & Mercanti, LLP

(57) ABSTRACT

A method for an exhaust-gas aftertreatment system which is operated on an internal combustion engine operated with an excess of air, in which exhaust-gas aftertreatment system soot particles are separated out of exhaust gas by a particle filter and the particle filter is regenerated with the aid of $NO_2$ formed on an NO oxidation catalytic converter mounted upstream of the particle filter. A reduction of the nitrogen oxides is realized by a reducing agent which splits to form ammonia being metered into the exhaust-gas flow upstream of the particle filter and the particle filter is laden with a catalytically active material for the selective catalytic reduction of nitrogen oxides. The $NH_3$ to $NO_x$ ratio (feed ratio $\alpha$) is varied in phases by changing the nitrogen oxide untreated emissions and/or the supplied amount of reducing agent, in such a way that the feed ratio $\alpha$ alternates in phases between values of greater than one and values of less than one.

17 Claims, 5 Drawing Sheets

(51) Int. Cl.
  *F02D 41/02* (2006.01)
  *F02D 41/38* (2006.01)
  *F02D 41/40* (2006.01)
  *B01D 53/94* (2006.01)

(56) References Cited

U.S. PATENT DOCUMENTS 8,209,966 B2 * 7/2012 Sakata et al. .................. 60/295
8,356,470 B2 * 1/2013 Nagaoka et al. ............... 60/286
8,426,641 B2 * 4/2013 Schaub et al. ................ 562/609
8,544,260 B2 * 10/2013 Boorse et al. .................. 60/299
8,640,448 B2 * 2/2014 Geveci et al. .................. 60/301
8,726,641 B2 * 5/2014 Zanetti et al. .................. 60/286

FOREIGN PATENT DOCUMENTS

| DE | 103 48 799 A1 | 6/2004 |
| DE | 103 23 607 A1 | 12/2004 |
| EP | 0 341 832 A2 | 11/1989 |
| EP | 1 054 722 A1 | 11/2000 |
| EP | 2 014 348 A2 | 1/2009 |

* cited by examiner

| Time [h] | Pressure loss without periodic NO$_x$ increase [kPa] | Pressure loss with periodic NO$_x$ increase [kPa] |
|---|---|---|
| 0 | 30 | 30 |
| 0.5 | 35 | 32 |
| 1 | 40 | 34 |
| 1.5 | 44 | 37 |
| 2 | 47 | 39 |
| 3 | 50 | 43 |
| 4 | 50.5 | 45.5 |
| 5 | 51 | 47 |
| 6 | 51.5 | 49.3 |
| 7 | 52 | 50 |
| 8 | 52.5 | 50.5 |
| 9 | 53 | 50.8 |
| 10 | 53.5 | 50.3 |
| 11 | 54 | 50.5 |
| 12 | 54.5 | 50.4 |
| 13 | 55 | 50.3 |
| 14 | 55.5 | 50.5 |
| 15 | 56 | 50.7 |
| 16 | 56.5 | 50.3 |
| 17 | 57 | 50.5 |
| 18 | 57.5 | 50.4 |
| 19 | 58 | 50.3 |
| 20 | 58.5 | 50.5 |
| 21 | 59 | 50.5 |
| 22 | 59.5 | 50.4 |
| 23 | 60 | 50.5 |
| 24 | 60.5 | 50.4 |
| 25 | 61 | 50.3 |
| 26 | 61.5 | 50.5 |
| 27 | 62 | 50.7 |
| 28 | 62.5 | 50.3 |

Fig. 4

METHOD FOR USE IN CONJUNCTION WITH AN EXHAUST-GAS AFTERTREATMENT SYSTEM

CROSS-REFERENCE TO RELATED APPLICATIONS

This application claims the priority of DE 10 2012 006 448.9 filed Mar. 30, 2012 which is incorporated by reference herein.

BACKGROUND OF THE INVENTION

1. Field of the Invention

The invention relates to a method for operating an exhaust-gas aftertreatment system in internal combustion engines operated with an excess of aft, such as diesel engines and gasoline engines with direct injection.

2. Description of Prior Art

Aside from solid particles, nitrogen oxides are among the limited exhaust-gas components which are generated during combustion processes and the permitted emissions of which are being progressively lowered. Various methods are currently used to minimize the exhaust-gas components in internal combustion engines operated in motor vehicles. The reduction of the nitrogen oxides is realized usually with the aid of catalytic converters; in oxygen-rich exhaust gas, a reducing agent is additionally necessary in order to increase the selectivity and the $NO_x$ conversion. These methods have become known under the collective term SCR methods, wherein SCR stands for "selective catalytic reduction". These methods have been used for many years in the field of power plants and recently &so for internal combustion engines. A detailed explanation of such methods emerges from DE 34 28 232 A1. In practical applications, ammonia or compounds which split to form ammonia, such as urea or ammonium formate, in solid form or in solution, are used as reducing agent. For the conversion from one mole of nitrogen monoxide, one mole of ammonia is required, wherein the nitrogen oxides react with the $NH_3$ deposited on the catalytic converter in accordance with the following equation:

$$4NO+4NH_3+O_2 \Rightarrow 4N_2+6H_2O \tag{1}$$

The ratio between $NH_3$ and $NO_x$ is referred to as the feed ratio α.

$$\alpha = NH_3/NO_x$$

In the case of an ideal catalytic converter, this means that, for a feed ratio of α=1, all of the nitrogen oxides are reduced, that is to say 100% $NO_x$ conversion is attained, because the following applies for the $NO_x$ conversion $X_{NOx}$:

where: $c_{NOx,0}$: $NO_x$ untreated emissions [ppm]

$c_{NOx}$: $NO_x$ emissions downstream of catalytic converter [ppm]

If a platinum-containing NO oxidation catalytic converter for forming $NO_2$ is positioned upstream of the SCR catalytic converters $$2NO+O_2 \Leftrightarrow 2NO_2 \tag{2}$$

then the SCR reaction can be accelerated considerably, and low-temperature activity can be markedly increased.

In the case of internal combustion engines operated in vehicles, the nitrogen oxide reduction with the aid of the SCR method is difficult because fluctuating operating conditions prevail there, which makes the quantitative metering of reducing agent difficult. It is duly sought, on the one hand, to attain as high as possible a conversion of nitrogen oxides; it must on the other hand be ensured that no emissions of unconsumed ammonia occur. To remedy this, use is often made of an ammonia blocking catalytic converter which is positioned downstream of the SCR catalytic converter and which converts excess ammonia into nitrogen and water vapour.

To minimize fine particle emissions, particle filters are used both in the power plant field and also in vehicles. In particle filters, the diameter of the filter ducts lies in the range of the diameters of the particles. Owing to this fact, particle filters are at risk of becoming blocked, which increases the exhaust-gas back pressure and reduces engine power. An arrangement and a method with a particle filter emerge from EP 0 341 832 A2. The abovementioned arrangements and the abovementioned method are characterized in that the oxidation catalytic converter—usually a catalytic converter with platinum as active material—arranged upstream of the particle filter oxidizes the nitrogen monoxide in the exhaust gas, with the aid of the residual oxygen likewise present in the exhaust gas, to form nitrogen dioxide, which in turn is converted in the particle filter with the carbon particles to form CO, $CO_2$, $N_2$ and NO. A continuous removal of the accumulated fine particles is realized in this way; regeneration cycles such as must be performed in a cumbersome manner in the case of other arrangements are thereby dispensed with.

If complete oxidation of the carbon stored in the particle filter is not attained with the aid of $NO_2$, the carbon fraction and thus the exhaust-gas back pressure progressively increase. If a critical mass is reached, an uncontrolled ignition of the carbon may occur at high exhaust-gas temperatures, which carbon then burns abruptly with oxygen.

This leads to a temperature rise to up to 1000° C.

The simultaneous use both of arrangements for reducing nitrogen oxide emissions and also arrangements for reducing fine particle emissions is necessary in order to comply with the future exhaust-gas regulations. Various arrangements and methods for this purpose have already become known.

DE 103 48 799 A1 describes an arrangement composed of an oxidation catalytic converter, an SCR catalytic converter arranged downstream of the oxidation catalytic converter in the exhaust-gas flow, and a particle filter arranged, in turn, downstream of the SCR catalytic converter in the exhaust-gas flow. The supply of the reducing agent for the selective catalytic reaction that takes place in the SCR catalytic converter takes place directly upstream of the SCR catalytic converter by means of a urea injection device that is controlled as a function of operating parameters of the internal combustion engine. A disadvantage of this arrangement is that the nitrogen dioxide generated in the oxidation catalytic converter is substantially completely consumed by the selective catalytic reduction in the SCR catalytic converter, that is to say is not available for the conversion of the fine particles that have accumulated in the downstream particle filter. The regeneration of the particle filter must therefore be effected in a cumbersome manner by cyclic heating of the exhaust-gas flow by

virtue of the exhaust-gas flow being enriched with unburned hydrocarbons and these subsequently being catalytically oxidized. This is realized either through enrichment of the combustion mixture or the injection of fuel upstream of the particle filter. Such an arrangement for the regeneration of the particle filter is firstly cumbersome and therefore expensive, and, secondly, the cyclic regeneration of the particle filter situated at the end of the arrangement generates new pollutants, such as carbon monoxide, which can be removed from the exhaust gas again only with difficulty.

A further combination of a particle filter and an arrangement for selective catalytic reduction has become known from EP 1 054 722 A1. The arrangement described therein is composed of an oxidation catalytic converter, which is arranged in the exhaust-gas flow and which increases the fraction of nitrogen dioxide in the exhaust gas, a fine particle filter arranged downstream, a reservoir for the reducing fluid, an injection device for the reducing fluid, the injection device being arranged downstream of the fine particle filter, and an SCR catalytic converter arranged downstream of the injection device in the exhaust-gas flow. The arrangement described above duly permits a continuous conversion of the soot-type fine particles that have accumulated in the fine particle filter with the aid of the nitrogen dioxide generated in the oxidation catalytic converter, but has another major disadvantage. The particle filter causes cooling of the exhaust gas, such that if for example the commercially available reducing fluid named AdBlue is used, it is the case in particular after starting of the internal combustion engine or during operation of the internal combustion engine in the lower power range that the exhaust-gas temperature is too low to generate ammonia from the 33% aqueous urea solution without the formation of problematic by-products.

In conjunction with the breakdown of urea $((NH_2)_2CO)$ to form ammonia $(NH_3)$, it is known that, under optimum conditions (temperatures above 350° C.), this takes place in two stages; firstly, the thermolysis, that is to say the thermal breakdown of urea, takes place as per the equation $$(NH_2)_2CO \Rightarrow NH_3 + HNCO \quad (8).$$

Subsequently, the hydrolysis, that is to say the catalytic breakdown of isocyanic add (HNCO) to form ammonia $(NH_3)$ and carbon dioxide $(CO_2)$, takes place as per the equation $$HNCO + H_2O \Rightarrow NH_3 + CO_2 \quad (9).$$

Since, if AdBlue is used, the reducing agent is present in a form dissolved in water, the water must evaporate before and during the actual thermolysis and hydrolysis.

If the temperatures prevailing during the above reactions (7) and (8) are below 350° C. or if heating takes place only slowly, it is known from DE 40 38 054 A1 that primarily solid, non-melting cyanuric add is generated by trimerization of the isocyanic add formed in equation (7), as per

$$3H CO \xrightarrow{<350° C. \ldots}_{\ldots >350° C.} (HNCO)_3 \quad (10),$$

which cyanuric add leads to blockage of the downstream SCR catalytic converter. This may be remedied, as stated in the cited DE 40 38 054, by virtue of the exhaust-gas flow which is laden with reducing agent being conducted across a hydrolysis catalytic converter. The exhaust-gas temperature above which quantitative hydrolysis becomes possible can thus be pushed to 160° C. The construction and composition of a corresponding catalytic converter is described in the cited publication, as is the construction and function of an SCR catalytic converter system equipped with a hydrolysis catalytic converter. Such an additional hydrolysis catalytic converter however additionally increases the cost of the arrangement for exhaust-gas aftertreatment.

An exhaust-gas aftertreatment arrangement composed of an oxidation catalytic converter and a downstream particle filter which is combined with an SCR catalytic converter to form a structural unit such that the particle filter is coated with an SCR-active compound or is composed of such a compound or has embedded SCR-active centres, is known from DE 103 23 607. For the introduction of the reducing agent, it is provided in this arrangement that a supply means for the reducing agent, preferably an aqueous urea solution, is provided downstream of the oxidation catalytic converter and upstream of the particle filter. Such an arrangement duly has the advantage of a small structural size and a low heat capacity, but, as tests have shown, has the disadvantage that, as a result of the ammonia storage property of SCR-active catalyst materials, a significant excess of ammonia can occur in those regions of the arrangement which are directly adjacent to the accumulated particles, such that the reaction as per equation (3) competes directly in a very limited space with the reaction as per equations (4) to (6). Therefore, fewer of the accumulated carbon particles are converted than would be necessary in order to avoid an increase of the exhaust-gas back pressure and the risk of an uncontrolled burn-off of the accumulated carbon particles as per equation (7) in the event of a critical particle mass being reached. The first results in a power decrease if the exhaust-gas aftertreatment arrangement is installed in the exhaust tract of an internal combustion engine, and the second results in possible destruction of the entire arrangement.

A further arrangement for exhaust-gas aftertreatment emerges from EP 2014348. This document specifies a method for the reduction of nitrogen oxides, which method comprises the following steps;

a) means for providing $NO_2$ in the exhaust gas which contains $NO_x$ and soot, wherein the means are engine-internal measures, and/or at least some of the exhaust gas which contains $NO_x$ and soot is brought into contact with an oxidation catalytic converter which increases the $NO_2/NO$, ratio;

b) an injection module which is designed to inject a predetermined amount of ammonia at least into some of the exhaust gas which contains $NO_x$ and soot, the ammonia being in the form of either pure ammonia or a precursor compound for ammonia such as urea, a liquid solution of urea, ammonium carbamate, isocyanic acid, cyanuric acid, methaneamide, etc. or combinations of these, wherein the injection module is arranged downstream of or parallel to the oxidation catalytic converter in the flow direction of the exhaust gas which contains $NO_x$ and soot, and c) a device for the filtering/separation of soot, that is to say carbon particles, wherein the $NO_x$ contained in the exhaust gas and the soot are intended to make contact with the soot that has accumulated in the device for the filtering/separation of soot, that is to say the carbon particles, with the ammonia-enriched exhaust gas which contains $NO_x$ and soot, whereby a selective catalytic reduction of at least some of the $NO_x$ molecules with the ammonia to form nitrogen and water is initiated.

SUMMARY OF THE INVENTION

Taking the prior art described above as a starting point, it is an object of the invention, while avoiding the disadvantages of known arrangements, to specify an exhaust-gas aftertreatment system for nitrogen oxide and particle reduction in internal combustion engines operated with an excess of air, which exhaust-gas aftertreatment system reduces both the particle emissions and the nitrogen oxide emissions, and the structural size of which exhaust-gas aftertreatment system is minimized through the combination of components and functions. It is a further object in particular to ensure the regeneration of the particle filter, and reliably prevent deposits from the reducing agent on the particle filter, through suitable process implementation.

The object is achieved by means of an exhaust-gas aftertreatment system and a method for the operation thereof as per the characterizing part of claim 1; advantageous refinements of the exhaust-gas aftertreatment system are specified in the dependent claims.

For the achievement of the object, it was assumed that, to attain the demanded exhaust-gas limit values, the nitrogen oxide reduction is realized by means of an SCR reaction with the aid of ammonia and the particle reduction is realized by means of a particle filter. The exhaust-gas aftertreatment system according to the invention provides a particle filter, which is a surface-type particle filter or a depth filter, in the exhaust-gas flow of the internal combustion engine. Upstream of the particle filter there is mounted a catalytic converter for the oxidation of NO to form $NO_2$ in order to ensure a regeneration of the particle filter by means of $NO_2$. For the implementation of the selective catalytic reduction of the nitrogen oxides, the particle filter is laden with soot and/or an SCR-active catalyst material. The supply of a reducing agent which splits to form ammonia such as is required for the generation of ammonia, or the supply of ammonia, takes place upstream of the particle filter. The abovementioned disadvantages of such an arrangement are eliminated by means of the process implementation described below: The supplied amount of reducing agent and/or the $NO_x$ untreated emissions are/is periodically raised or lowered such that, in periods with a low feed ratio, the amount of $NO_x$ exceeds the supplied amount of reducing agent, which in turn has the result that a reaction of the $NO_x$ with the ammonia that has already accumulated on the soot filter and/or on the SCR-active catalyst material takes place while $NH_3$ is no longer being provided in sufficient amounts to keep the ammonia loading of the soot filter and/or SCR-active catalyst material constant, and therefore the ammonia loading thereof decreases. In particular, the ammonia loading at the filter inlet and on that side of the filter wall which faces towards the untreated exhaust gas decreases. Since the SCR reaction as per equations 1 and 3 however takes place via intermediate stages of $NH_3$ accumulated on the soot filter and/or SCR-active catalyst material, this has the result that the focus of the $NO_x$ conversion is shifted from the filter inlet and the untreated-gas side of the filter wall towards the filter outlet and the clean-gas side of the filter wall. In this way, the amount of $NO_2$ on the untreated-exhaust-gas side of the particle filter is increased owing to the reduced conversion taking place there owing to the local deficiency of $NH_3$. As a result of the increased $NO_2$ availability, the oxidation of the soot that has been deposited on the untreated-exhaust-gas side of the particle filter is improved considerably. To nevertheless ensure a high $NO_x$ conversion, it is provided that, after phases with low feed ratio and before all of the ammonia stored in the soot filter and/or SCR-active catalyst material has been consumed, the supplied amount of reducing agent is increased and/or the $NO_x$ untreated emissions are decreased such that the supplied amount of reducing agent exceeds the amount of $NO_x$, that is to say a high feed ratio is present. As a result of this measure, the soot filter and/or the SCR-active catalyst material is laden with $NH_3$ again, whereby a decrease of $NO_x$ conversion rates can be prevented.

The advantage of the method according to the invention thus consists in large amounts of $NO_2$ periodically being present on the soot-particle-containing untreated-exhaust-gas side, which large amounts of $NO_2$ permit a reliable oxidation of the carbon-containing soot, while large amounts of $NH_3$ are subsequently stored in the soot filter and/or SCR-active catalyst material, whereby high $NO_x$ conversion rates can be attained.

To accelerate the "discharging" of ammonia from the catalytic converter, it is possible for the supply of reducing agent to be completely prevented or at least reduced in the phases.

The $NO_x$ untreated emissions may, as already described, be varied by changing operating parameters of the internal combustion engine. Operating parameters which have a direct influence on the $NO_x$ emissions include inter alia the start of injection of the fuel, the air to fuel ratio (lambda), the fuel injection pressure, the number and chronological sequence of fuel injections per working stroke, the intake air temperature and the recirculated amount of exhaust gas (EGR rate) if exhaust-gas recirculation is provided. The advantage of the reduction of the feed ratio by means of the increase of the $NO_x$ untreated emissions consists in that the $NO_2$ availability on the untreated-gas side is increased not only by the depletion of $NH_3$, that is to say the degraded SCR reaction, but rather the amount of $NO_2$ supplied to the particle filter is raised already owing to the increased $NO_x$ untreated emissions, whereby the soot oxidation is additionally accelerated.

Since the ammonia storage and release behaviour is highly dependent on the operating conditions of the exhaust-gas aftertreatment system, such as temperature, degree of ammonia loading, $NO_x$ conversion, $NO_x$ untreated emissions, $NO_2$ emissions upstream of the particle filter, $NO_x$ emissions downstream of the system, $NH_3$ emissions downstream of the system and supplied amount of reducing agent, it is advantageous for the period length and/or the magnitude of the increase and/or the magnitude of the reduction and/or the duration of the increase and/or the duration of the reduction of the $NO_x$ untreated emissions and/or of the supplied amount of reducing agent to be made dependent on the variables.

Aside from the ammonia storage and release behaviour, reliable particle filter regeneration is essential for fault-free functioning of the system. For this reason, it is expedient for the period length and/or the magnitude of the increase and/or the magnitude of the reduction and/or the duration of the increase and/or the duration of the reduction of the $NO_x$ untreated emissions to also be made dependent on the soot loading of the particle filter.

The above-described variables may be determined either directly by means of sensors, such as pressure, temperature, $NO_x$, $NH_3$ and $NO_2$ sensors, or by means of models in the form of mathematical functions, characteristic maps and/or neural networks.

To keep the structural volume of the filter small, the catalyst is applied predominantly in the gas-permeable regions of the filter, such that particle separation and $NO_x$ reduction can take place in a very limited space.

Materials which are advantageously suitable for the particle filter with regard to the loading with SCR-active catalyst material are cordierite or silicon carbide or sintered metal or ceramic fibres or silicate fibres or metal meshes.

It is expedient, and thus advantageous, for the loading with SCR active catalyst material on the outflow side of the particle filter to increase in the flow direction of the exhaust gas. The corresponding distribution of the SCR-active material can be attained by virtue of the particle filter being built up in layers, wherein the outflow-side layers have a loading with the SCR-active material which increases in the flow direction of the exhaust gas. It is self-evidently also possible for the loading with the SCR-active material to be realized by coating or impregnating the outflow side of the particle filter such that the degree of loading of the filter material decreases with progressive penetration depth of the coating or impregnation solution. The SCR-active catalyst material with which the particle filter is laden may contain, as active component, vanadium(IV) oxide and/or $V_2O_5$ and/or $WO_3/TiO_2$ and/or iron-containing zeolites and/or copper-containing zeolites and/or cobalt-containing zeolites, wherein zeolite-containing catalyst types are preferable owing to their high $NH_3$ storage capability.

To promote the splitting of ammonia from the reducing agent, it is furthermore advantageous for the particle filter to additionally be coated or impregnated on the inflow side with a correspondingly active catalyst material for the formation of $NH_3$. As an active component for a catalyst material of this type, use may be made of $TiO_2$ and/or $TiO_2/SiO_3$ and/or $TiO_2/SiO_2/Al_2O_3$ and/or zirconium oxides and/or zeolites.

To prevent any unconsumed $NH_3$ from passing into the environment during the SCR reaction, it is advantageous for the particle filter to additionally be coated or impregnated on the outflow side, at the end of the loading with SCR-active catalyst material as viewed in the flow direction of the exhaust gas, with a catalyst material which oxidizes excess ammonia present in the exhaust gas. The catalyst material suitable for this purpose for oxidizing excess ammonia may contain elements of the platinum group and/or the oxides thereof and/or zeolites as active component.

One particularly expedient and thus advantageous embodiment of the particle filter provides that the latter forms blind-hole-like or pocket-like chambers both on its inflow side and also on its outflow side, wherein those situated on the inflow side are open towards the inflow side and those on the outflow side are open towards the outflow side.

BRIEF DESCRIPTION OF THE DRAWINGS

The invention will be explained in more detail below with the aid of the drawings and on the basis of some examples. In the drawings:

FIG. 4 is a table showing a comparison of the effects with and without an $NO_2$ increase.

DETAILED DESCRIPTION OF THE PREFERRED EMBODIMENTS

Figure 1:
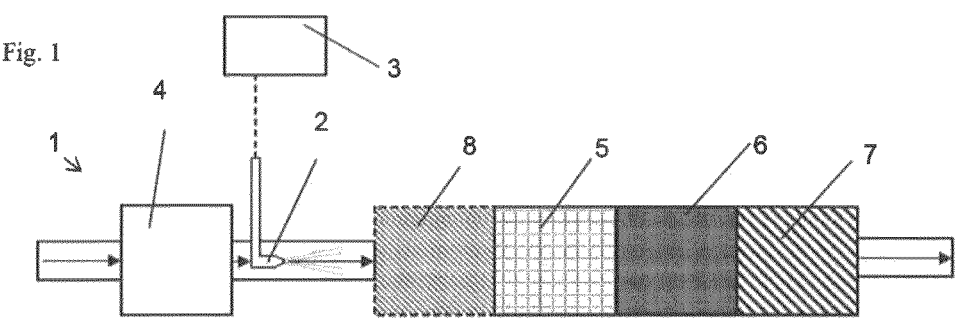
FIG. 1 is a schematic illustration of an exhaust-gas aftertreatment system.

An exhaust-gas aftertreatment system for selective catalytic reduction and for the reduction of solid particles in the exhaust gas of an internal combustion engine is shown in a schematic illustration in FIG. 1. The exhaust gases generated by an internal combustion engine (not illustrated) as a result of the combustion processes, the exhaust gases being indicated in FIG. 1 by the arrows, pass into the exhaust-gas aftertreatment system 1, in which the hot exhaust gas firstly flows through an oxidation catalytic converter 4, the task of which is to oxidize some of the nitrogen monoxide contained in the exhaust gas to form nitrogen dioxide by means of the excess oxygen present in the exhaust gas, as per the reaction labelled (2) above. Downstream of the oxidation catalytic converter, a reducing agent is metered in at as dose-coupled a position as possible. The reducing agent is an aqueous urea solution, as is conventional in practice in motor vehicles with SCR reaction; it is however self-evidently also possible for urea in solid form to be metered in, as has already been described in detail in the relevant technical literature. Furthermore, it is possible for ammonia to be metered in as reducing agent, which ammonia is obtained at some other location, for example under more expedient thermal conditions, from a substance which splits to form ammonia. The metering-in is performed as a function of operating parameters of the internal combustion engine in a manner controlled by means of an engine control unit (not illustrated) and a reducing agent metering device 3, in such a way that the aqueous urea solution is injected into the exhaust-gas partial flow via a nozzle 2. The nitrogen dioxide generated, as described above, in the oxidation catalytic converter 4 is required firstly for the reduction of the solid particles and secondly for the downstream SCR reaction, as will be described in more detail below.

Downstream of the reducing agent injection point there is arranged a particle filter 5 which accumulates the soot particles in the exhaust gas. The soot particles thus captured in the particle filter 5 are continuously converted, by means of the nitrogen dioxide generated upstream with the aid of the oxidation catalytic converter 4, to form carbon monoxide, carbon dioxide, nitrogen and nitrogen monoxide, such that cumbersome regeneration cycles for the particle filter 5 are dispensed with.

The actual selective catalytic reduction of the nitrogen oxides takes place, as per the reaction described in EP 2014384 A2, by means of the soot loading and an SCR catalytic converter 6 which is duly schematically shown as a separate component in FIG. 1 for the sake of simplicity but which, as described further below, is formed as an SCR-active loading on the particle filter 5 in the reduction reaction in question, it is sought to convert as great as possible a fraction of the nitrogen oxides ($NO_x$) present in the exhaust gas into nitrogen and water vapour while simultaneously achieving high selectivity of the reduction, without excess ammonia ($NH_3$) remaining present in the exhaust-gas flow. The method described in EP 2014384 A2 is expressly incorporated into this description.

The intensely exothermic soot oxidation can result in a considerable temperature rise, such that temperatures above 650° C., which lead to damage of SCR catalysts containing $V_2O_5$, may by all means occur downstream of the particle separator. For this reason, the use of SCR catalysts without $V_2O_5$, which are usually based on iron, cobalt or copper zeolite material, may be expedient.

In the light of the constantly fluctuating operating conditions of an internal combustion engine which is operated in a motor vehicle, it is obvious that the desired highest possible conversion rate for nitrogen oxides can be reliably attained only if a slight excess of ammonia is accepted. In order, in situations of inadequate conversion, to prevent poisonous ammonia from being discharged with the partially purified exhaust gas into the ambient air, there is positioned downstream of the SCR catalytic converter an $NH_3$ oxidation catalytic converter 7 by means of which the excess $NH_3$ is converted into nitrogen and water vapour. The $NH_3$ oxidation catalytic converter 7, likewise shown schematically in FIG. 1 as a separate component, may likewise be part of the combination of particle filter 5 and SCR catalytic converter, as presented further below. The oxidation reaction for the elimination of the excess ammonia should take place as selectively as possible, such that at least fractions of iridium or iridium oxide should be used as active material for the $NH_3$ oxidation catalytic converter 7.

As is also shown in FIG. 1 by the dashed circumferential line, a hydrolysis catalytic converter 8 may be used in order to improve the splitting of the ammonia from the reducing agent if the temperature level is not high enough at the supply point for the reducing agent. The hydrolysis catalytic converter 8, arranged downstream of the supply point of the reducing agent and upstream of the particle filter 5 in the exhaust-gas flow, is likewise shown schematically as a separate component in the drawing, but may also be a loading of correspondingly active catalyst material on the inflow side of the particle filter 5, as presented further below.

Figure 2:
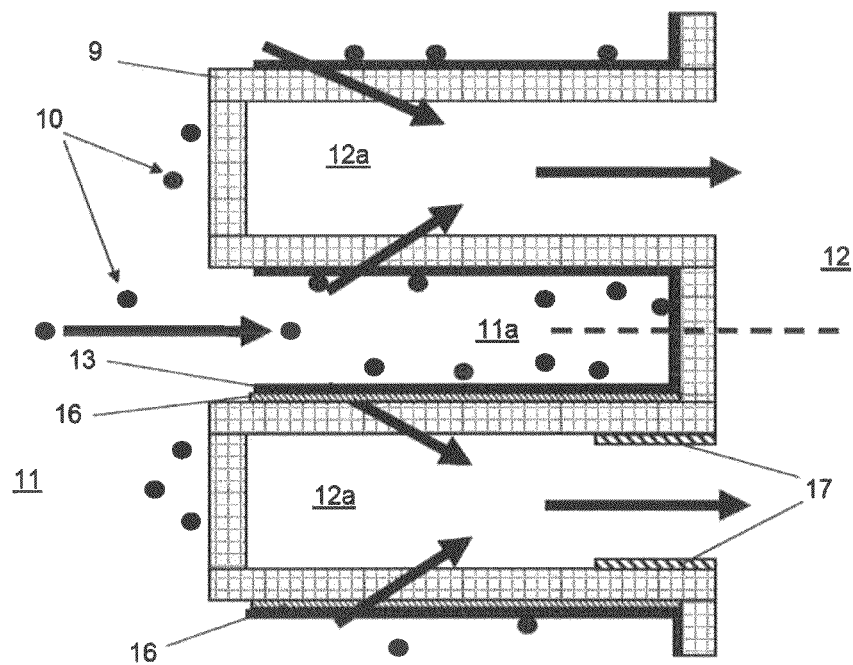
FIG. 2 shows a combination of a particle filter and an SCR catalytic converter in a schematic illustration.

The design of a particle filter with SCR activity is shown, likewise schematically and in a sectional illustration, in FIG. 2, wherein the selected section plane runs parallel to the flow direction of the exhaust gas. The flow direction is indicated here by arrows.

The particle filter 9 has, both on its inflow side 11 and &so on its outflow side 12, blind-hole-like or pocket-like chambers 11a, 12a, wherein those which are situated on the inflow side 11 are open towards the inflow side 11 and those which are situated on the outflow side 12 are open towards the outflow side 12. As filter material for the particle filter 9, use may be made of cordierite or silicon carbide or else sintered metal or ceramic fibres and silicate fibres or metal meshes. The particle filter is coated or impregnated with SCR-active material such that it serves not only for the separation of the soot particles but also as a catalytic converter for the reduction of nitrogen oxides.

As can be seen in the illustration, the exhaust-gas flow which is laden with soot particles 10 and with ammonia ($NH_3$) (not illustrated) impinges on the inflow side 11 of the particle filter 9 and the soot particles 10 are accumulated as a so-called filter cake 13 in particular in the blind-hole-like or pocket-shaped chambers 11a, before the exhaust gas which has thus been purified of soot particles 10 flows through the filter material to the blind-hole-like or pocket-like chambers 12a of the outflow side 12. Before reaching the chambers 12a, the exhaust gas which is laden with $NH_3$ flows through the SCR catalyst layer (not illustrated here), which is applied in and on the filter wall, until the exhaust gas flows out of the blind-hole-like or pocket-shaped chambers 12a. On the path through the layer laden with SCR-active catalyst material, and in the chambers 11a and 12a, the selective catalytic reduction as per reactions (1) and (2) takes place, wherein the nitrogen oxides are converted into nitrogen and water vapour. The exhaust gas which is thus purified of soot particles and nitrogen oxides exits the filter arrangement on the outflow side 12.

For the regeneration of the particle filter 9, the filter cake 13 must be continuously removed. The continuous removal of the filter cake 13 is realized, as already described with regard to FIG. 1, by virtue of an oxidation catalytic converter (not illustrated in FIG. 2) being positioned upstream of the particle filter 9, which oxidation catalytic converter converts at least some of the nitrogen monoxide present in the exhaust gas into nitrogen dioxide as per reaction (2). The oxidation catalytic converter must also be situated upstream of the point at which the reducing agent is metered into the exhaust-gas flow, because otherwise the reducing agent would be oxidized and thus unusable for the SCR reaction. The continuous regeneration of the filter cake is realized, as already described above, by means of the periodic alternation between superstoichiometric and substoichiometric feed ratio, and thus by means of a periodically high availability of the powerful oxidant $NO_2$.

Upon contact with the filter cake 13, the nitrogen dioxide which is enriched in the exhaust gas effects a conversion of the soot particles 10 to form CO, $CO_2$, $N_2$ and NO as per reactions (4), (5) and (6), wherein the reactions take place in a fluctuating manner within the context of the $NO_2$ availability but continuously such that the filter cake can be kept at a substantially constant thickness and the exhaust-gas back pressure caused by the filter cake can be kept at a substantially constant level.

For reasons of thermal stability of the SCR-active catalyst layer, it may be advantageous for the SCR-active loading of the particle filter to increase in the flow direction of the exhaust gas. This may be achieved either by virtue of the particle filter being but up in layers, wherein the loading of the layers with SCR-active material increases in the flow direction of the exhaust gas, or by virtue of the loading with the SCR-active material being realized by means of coating or impregnation of the outflow side of the particle filter such that the degree of loading of the filter material decreases with progressive penetration depth of the coating or impregnation solution.

In order to obtain as high as possible a conversion of nitrogen oxides to form nitrogen and water vapour during transient operation of the internal combustion engine, which is the normal situation in the case of internal combustion engines operated in vehicles, it is necessary to operate the exhaust-gas aftertreatment system with a slight excess of ammonia. Since the poisonous ammonia gas must not be discharged into the ambient air, it is necessary for an ammonia oxidation catalyst 17 to be provided, for example as a coating, on the end of the exhaust-gas aftertreatment arrangement, as shown at the bottom in FIG. 2.

Possible production methods for the main body of the particle filter 3 shall be presented, likewise by way of example and in principle, in conjunction with FIG. 2. To produce a blind-hole-like structure, it is possible either for a multiplicity of tubular structures to be combined to form a dense pack, wherein adjacent tubes in each case are closed off alternately either on the inflow side or on the outflow side. The closure may be realized by means of the same material as that which is also used for the particle filter 9; the material may however also differ, that is to say be neutral. A further possibility for the production of the blind-hole-like chambers 11a, 12a consists in providing ducts in a block-like filter body, of which adjacent ducts in each case are alternately closed off at the respectively opposite ends.

One possibility for producing pocket-like structures consists in producing packs of plates which are spaced apart from one another, wherein the adjacent free spaces generated by the spacing are in each case alternately closed off on the inflow side 11 and on the outflow side 12, such that a pocket-like structure is formed.

As already stated in conjunction with FIG. 1, in order to improve the splitting of ammonia from the reducing agent—for example aqueous urea solution (AdBlue)—it may be necessary to use a catalytic converter which promotes the splitting in order to prevent the formation of cyanuric acid as per reactions (7) and (9). The formation of cyanuric acid is a problem because it can result in blockage of the particle filter and thus to failure not only of the exhaust-gas aftertreatment system but also of the internal combustion engine. To improve the splitting of ammonia from the reducing agent, the catalytic converter is produced such that, as schematically shown in the lower part of FIG. 2, the inflow side of the particle filter 9 is laden with a catalyst material 16 which promotes the splitting. Materials which may be used for this purpose include $TiO_2$ or $TiO_2/SiO_2$ or $TiO_2/SiO_2/Al_2O_3$, zirconium oxide and zeolites.

Figure 3:
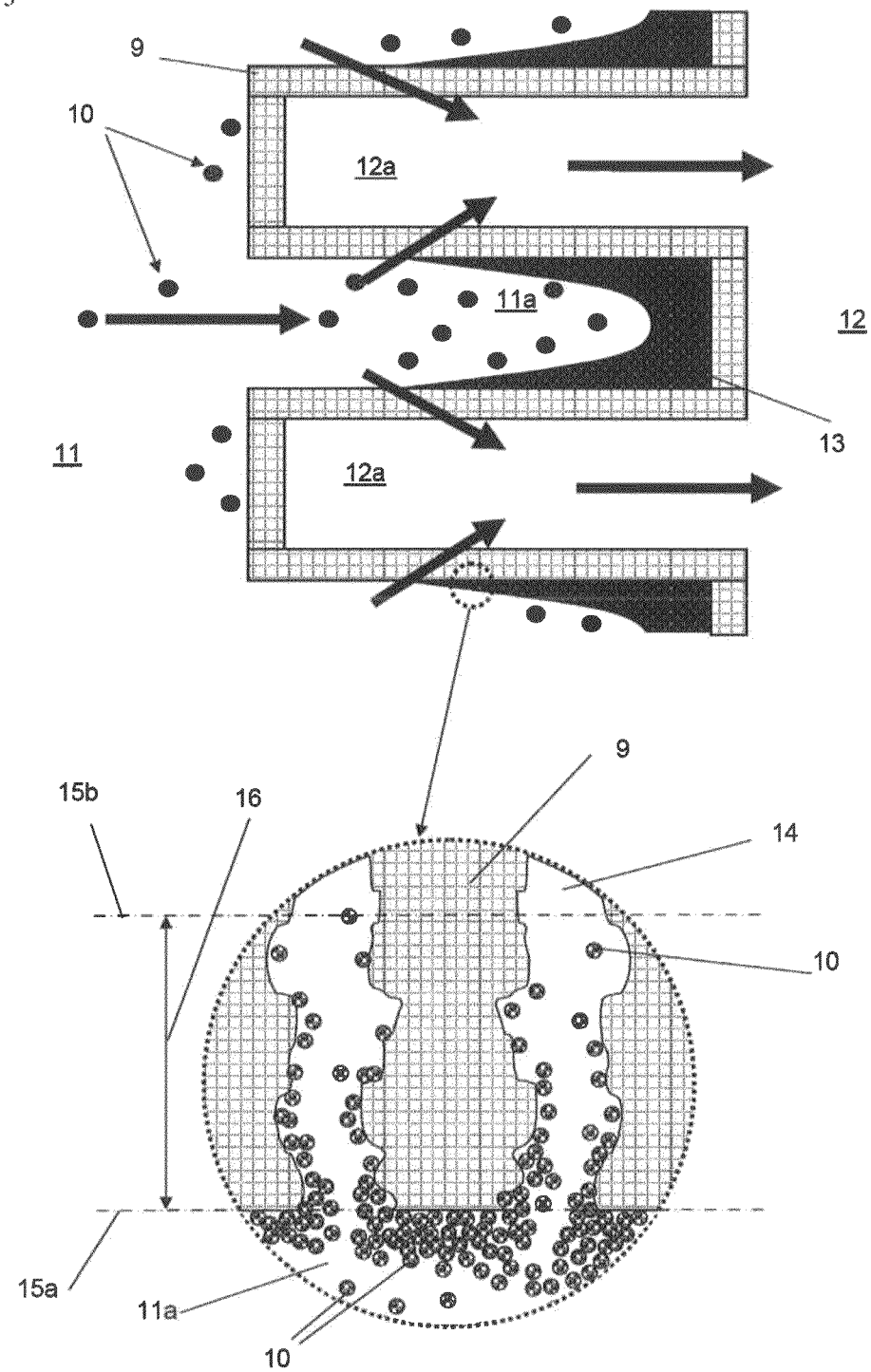
FIG. 3 shows a combination of a particle filter and an SCR catalytic converter in a schematic illustration with a detail cutout.

For more detailed explanation of the effects attained in the particle filter 9 with the proposed method implementation, reference is made below to the illustration as per FIG. 3, which shows an arrangement similar to that shown in FIG. 2; the same reference symbols have been used for identical parts such that a repeated description of the parts can be dispensed with, reference being made to the corresponding parts of the description relating to FIG. 2.

During the course of the loading with soot, a filter cake forms in the chambers 11a, which filter cake, illustrated on an exaggerated scale, increases with progressive depth of the chambers 11a. For the illustration of the processes, reference is made to the detail illustration at the bottom of FIG. 3. For the sake of simplicity, it is assumed that the particle filter 9 is impregnated uniformly with catalyst material. In the filter material there are formed pores 14 which form free passages through the filter material. Owing to the known effects of convection and diffusion and if appropriate thermophoresis, soot particles 10 accumulate in the chambers 11a and also in the wall regions of the pores 14. If, owing to the ammonia storage effect, soot and SCR-active material of the particle filter 9 are now saturated with ammonia, sufficient $NH_3$ availability is attained in the region of the soot layer, of the ducts 14 and also in the chambers 11a such that nitrogen dioxide contained in the exhaust-gas flow, which nitrogen dioxide was formed on the upstream oxidation catalytic converter, reacts with the ammonia as per equation (3). As a result, a depletion of $NO_2$ occurs in this region, such that there is insufficient $NO_2$ available for the oxidation of the soot particles as per equations (4) to (6). As a result, the soot layer grows and leads to an increased exhaust-gas back pressure, which would be associated with a corresponding power loss if the particle filter 9 is installed in conjunction with an internal combustion engine.

To counteract this, it is now possible to temporarily reduce the availability of reducing agent, resulting in a depletion of $NH_3$ proceeding from the duct net or from the untreated-gas side towards the clean-gas side, and consequently a shift of the SCR reaction away from the duct net or in the direction of the clean-gas side. Before all of the stored $NH_3$ has been consumed by the SCR reaction, the $NH_3$ store must be refilled, otherwise an intense increase of $NO_x$ emissions would occur downstream of the particle filter. This however has the result that, after such decrease phases, a disproportionately large amount of reducing agent must be used in order to refill the ammonia store such that the reduction of the nitrogen oxides can take place to a sufficient extent. Since aqueous urea solution is used as reducing agent in motor vehicle applications, that is to say in conjunction with internal combustion engines, the disproportionately high increase of the amount of reducing agent causes cooling of the exhaust gas and thus of the SCR-laden particle filter 9. Under critical operating conditions, this may lead to incomplete conversion of aqueous urea solution into ammonia owing to excessively low temperatures. The formation of intermediate products such as for example isocyanic add may then occur as per equation (8), which isocyanic add is then converted by trimerization, as per equation (10), into cyanuric add. The cyanuric add accumulates as solid matter on the particle filter and blocks the latter. Since such deposits can be dissolved again only with difficulty, this would lead, over a relatively long period of time, to failure of the internal combustion engine.

To counteract this problem, the nitrogen oxide emissions of the internal combustion engine are alternatively, or in combination, increased; this is a measure which opposes that which is actually intended, because the nitrogen oxides are indeed that exhaust-gas constituent which is to be avoided. This is achieved in the case of an internal combustion engine by virtue of certain operating parameters being changed by way of interventions into the engine management, which is currently realized by means of electronic engine control systems. In the case of air-compressing, auto-ignition internal combustion engines, for example, operating parameters which have a direct influence on the $NO_x$ emissions include inter alia the start of injection for the fuel injection, the air to fuel ratio (lambda), the fuel injection pressure, the number of fuel injections per working stroke, the intake air temperature and the amount of exhaust gas recirculated (EGR rate) if exhaust-gas recirculation is provided.

For example, an adjustment of the start of injection in the early direction, a reduction of the EGR rate, an increase of the fuel injection pressure, of the air to fuel ratio or of the intake aft temperature, for example by virtue of the charge-aft cooler being bypassed, leads to an increase of the $NO_x$ untreated emissions.

Here, an increase of the $NO_x$ emissions usually also entails an increase of the combustion temperature, which has the effect that the temperature level in the exhaust gas and consequently at the SCR-laden particle filter 9 increases. The opposite effect, therefore, to that which would be attained in the case of a cyclic reduction and subsequent disproportionately high increase of the amount of reducing agent that is added (see above). This benefits the functional reliability of the particle filter 9 because the formation of cyanuric add can be reliably prevented. Furthermore, the conversion rate both of soot particles and also of nitrogen oxides is positively influenced because the exhaust-gas temperature and particle filter/catalytic converter temperature can be kept in an optimum range.

Figure 5:
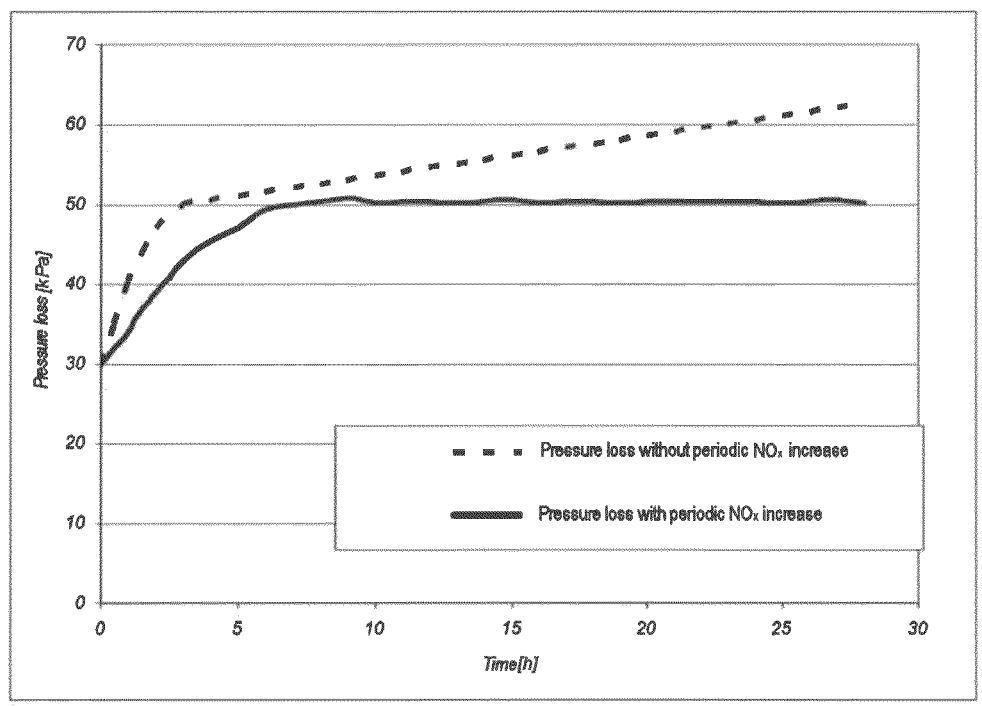
FIG. 5 shows a graphic illustration of the comparison in FIG. 4.

The effect of the measure described above can be presented on the basis of a test example. For this purpose, a diesel engine of type MAN D2676 was operated once with and once without the process implementation according to the invention, under constant load in each case; the amount of reducing agent remained unchanged. The increase of the $NO_x$ emissions was performed cyclically every 3 seconds for 1 second in each case; the dosed amount of AdBlue and the integrated $NO_x$ untreated emissions were kept constant. The operating duration was 28 hours. As a comparative variable, the pressure loss across the particle filter was determined after every hour of operation. The result of the comparison is presented in the table in FIG. 4 and illustrated in diagram form in the graph of FIG. 5. As can be seen from the table and the graphic illustration, without periodic $NO_x$ increase, the pressure loss generated by the SCR-laden particle filter, measured in kPa, increases relatively sharply in the first 3 hours of operation from the initial value of 30 kPa, the pressure loss across the unladen filter, until a filter cake has formed in the filter; thereafter, the increase of the pressure loss duly slows, but not to zero. In the case of the periodic $NO_x$ increase and the associated $NO_2$ increase resulting from the $NH_3$ depletion on the untreated-gas side, a different picture emerges. Here, a slowed increase of the pressure loss is evident, and the pressure loss increases no further after approximately 6 operating hours.

During the course of the test with periodic $NO_x$ increase, no increased $NO_x$ fractions were encountered in the exhaust gas, as determined by measurements downstream of the catalytic converter arrangement.

The comparative data shows that, with the process implementation according to the invention, an increase of the pressure loss across the particle filter 9 can be avoided without any change in the amount of reducing agent, and blockage of the particle filter 9 can be reliably prevented. An active, oxygen-based regeneration of the particle filter with the associated disadvantages can be dispensed with. Since an intense cyclic decrease of the amount of reducing agent with subsequent disproportionately high increase likewise does not take place, the risk of blockage of the particle filter as a result of inadequate reducing agent breakdown is likewise eliminated.

Figure 6:
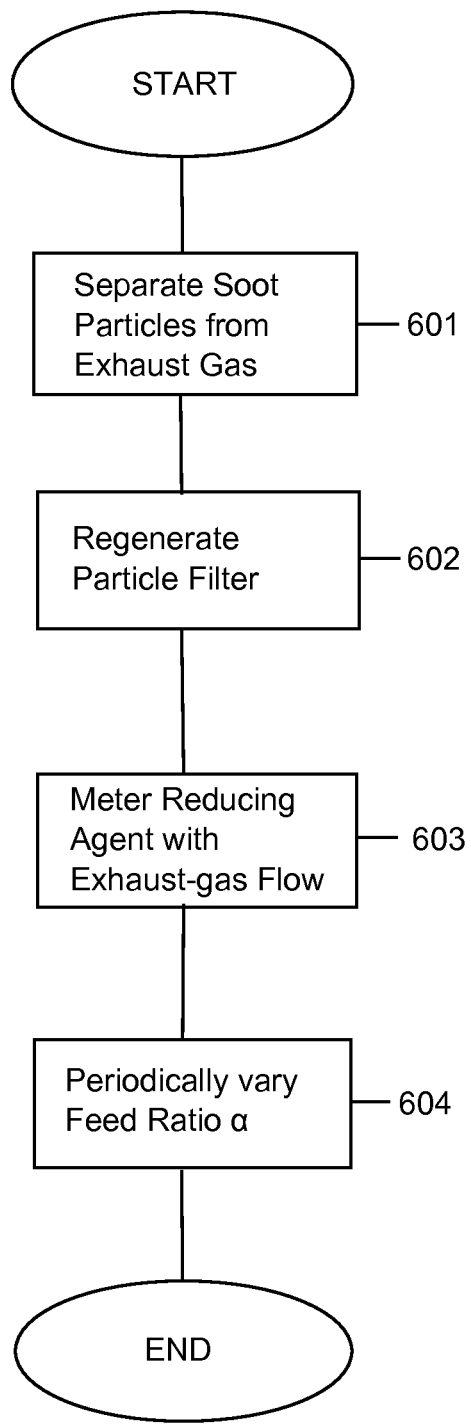
FIG. 6 is a flow diagram of a method for an exhaust-gas aftertreatment system that operates on exhaust gas of an internal combustion engine according to an embodiment of the present invention.

FIG. 6 is a flow diagram showing a process according to the present invention for an exhaust-gas aftertreatment system that operates on exhaust gas of an internal combustion engine operated with an excess of air. According to the process, a particle filter separates soot particles out of the exhaust gas, step 601. The particle filter is regenerated using $NO_2$ formed on an NO oxidation catalytic converter mounted upstream of the particle filter, step 602. Nitrogen oxides are reduced by metering a reducing agent, which splits to form ammonia, into an exhaust-gas flow upstream of the particle filter, step 603. An $NH_3$ to $NO_x$ ratio (feed ratio $\alpha$) is periodically varied in phases by changing at least one of the nitrogen oxide ($NO_x$) untreated emissions and the metered amount of reducing agent, in such a way that the feed ratio $\alpha$ periodically alternates in phases between values of greater than one and values of less than one, step 604. In an example described above, the periodic variation of the feed ratio $\alpha$ is achieved by increasing the $NO_x$ for one second every three seconds for an entire operating duration of the engine.

The central concept of the proposed process implementation is that of varying the $NH_3$ to $NO_x$ ratio (feed ratio $\alpha$) in phases by varying the urea dosing and/or the nitrogen oxide untreated emissions. By means of this measure, as indicated in the detail illustration in FIG. 3, the stored ammonia is exhausted in phases in the soot layer and between the catalyst surface indicated by the line 15a and an imaginary line 15b in the particle filter/catalyst material, such that as a result, an $NH_3$ depletion zone 16 is generated in the particle filter/catalytic converter and, as a result of the locally decreased $NO_x$ conversion, a surplus of $NO_2$ is produced in the ducts 11a and in those regions of the pores 14 which are adjacent to the catalytic converter surface. The surplus of $NO_2$ leads to an intensified oxidation of the stored soot particles.

The process implementation illustrated by way of example above may self-evidently be varied. It is for example possible to optimize the effect of the method by virtue of the supplied amount of reducing agent not being adapted correspondingly, in particular not being adapted proportionally, to the periodically fluctuating $NO_x$ untreated emissions. A decrease of the amount of reducing agent is also conceivable here; it must however be ensured here, for example by means of temperature measurement upstream of and/or at the combined particle filter-SCR catalytic converter, that a predefined temperature level is not undershot as the amount of reducing agent is increased again. It is in particular expedient to decrease the supplied amount of reducing agent, or to suspend the supply of reducing agent entirely, in the phases with high $NO_x$ untreated emissions in order thereby to accelerate the $NH_3$ depletion on the soot-laden side of the particle filter.

It may furthermore be advantageous for the period length and/or the magnitude of the increase and/or the magnitude of the reduction and/or the duration of the increase and/or the duration of the reduction of the $NO_x$ untreated emissions to be selected as a function of the operating conditions of the exhaust-gas aftertreatment system. Here, the catalytic converter temperature and/or the degree of ammonia loading of the catalytic converter and/or the $NO_x$ conversion and/or the $NO_x$ untreated emissions and/or the amount of $NO_2$ upstream of the particle filter and/or the $NO_x$ emissions downstream of the exhaust-gas aftertreatment system and/or the $NH_3$ emissions downstream of the exhaust-gas aftertreatment system and/or the supplied amount of reducing agent and/or the stored amount of $NH_3$ and/or the storable amount of $NH_3$ and/or the degree of loading of the particle filter with soot may be taken into consideration as operating conditions. Such operating conditions may be determined by means of sensors and/or by means of models in the form of mathematical functions, characteristic maps and/or neural networks. Such techniques are known to a person skilled in the art, and therefore a detailed description is not required.

If unconsumed $NH_3$ passes the SCR catalytic converter, it may be provided that the $NH_3$ is broken down by a material loading with an oxidative action arranged on the clean-gas side of the particle filter.

Furthermore, the proposed process implementation may be assisted by virtue of the loading of the particle filter with SCR-active material being realized such that the ammonia storage capability of the particle filter laden with SCR-active catalyst material increases towards the clean-gas side. By means of this measure, those regions of the particle filter laden with SCR-active catalyst material which are close to the soot deposits can be placed into the $NH_3$-depleted state by means of a relatively small increase of the nitrogen oxide untreated emissions.

It must finally be expressly pointed out that an SCR-active coating or impregnation of the particle filter is not necessary for the implementation of the method according to the invention, because the soot layer alone already exhibits the effect of an SCR catalytic converter, and the method according to the invention is also effective in an arrangement of this type.

The invention claimed is:

1. A method for an exhaust-gas aftertreatment system that operates on exhaust gas of an internal combustion engine operated with an excess of air, the method comprising:
   separating, by a particle filter, soot particles out of the exhaust gas;
   regenerating the particle filter with the aid of $NO_2$ formed on an NO oxidation catalytic converter mounted upstream of the particle filter;
   reducing nitrogen oxides by metering a reducing agent, which splits to form ammonia, into an exhaust-gas flow upstream of the particle filter, wherein the particle filter is laden with a catalytically active material for selective catalytic reduction of nitrogen oxides;
   periodically varying an $NH_3$ to $NO_x$ ratio (feed ratio $\alpha$) in phases by changing at least one of the nitrogen oxide ($NO_x$) untreated emissions and the metered amount of reducing agent, in such a way that the feed ratio $\alpha$ periodically alternates in phases between values of greater than one and values of less than one.

2. The method according to claim 1, wherein the catalytically active material includes one of soot deposited on the particle filter and an SCR catalyst applied to the particle filter.

3. The method according to claim 2, wherein the SCR catalyst contains vanadium oxide or zeolite.

4. The method according to claim 1, wherein a supplied amount of the reducing agent is not adapted correspondingly to periodically fluctuating $NO_x$ untreated emissions.

5. The method according to claim 1, wherein, during phases with high $NO_x$ untreated emissions, a supplied amount of reducing agent is reduced or suspended entirely.

6. The method according to claim 1, wherein the step of varying comprises raising the $NO_x$ untreated emissions by one of changing the start of injection of the fuel, the air to fuel ratio, the fuel injection pressure, the number and chronological sequence of the individual fuel injections during a working stroke, the recirculated amount of exhaust gas, and the intake air temperature.

7. The method according to claim 1, wherein at least one of the period length, the magnitude of the increase, the magnitude of the reduction, a duration of the increase, and a duration of the reduction of the $NO_x$ untreated emissions is selected as a function of the operating conditions of the exhaust-gas aftertreatment system.

8. The method according to claim 7, the operating conditions include at least one of a catalytic converter temperature, a degree of ammonia loading of the catalytic converter, an $NO_x$ conversion, the $NO_x$ untreated emissions, the amount of $NO_2$ upstream of the particle filter, the $NO_x$ emissions downstream of the exhaust-gas aftertreatment system, the $NH_3$ emissions downstream of the exhaust-gas aftertreatment system, the supplied amount of reducing agent, the stored amount of $NH_3$, the storable amount of $NH_3$, and the degree of loading of the particle filter with soot.

9. The method according to claim 7, further comprising the step of determining operating conditions of the exhaust-gas aftertreatment system by sensors or by models in the form of mathematical functions, characteristic maps, or neural networks.

10. The method according to claim 1, further comprising the step of breaking down unconsumed $NH_3$ that passes the catalytically active material by a material loading with an oxidative action arranged on a clean-gas side of the particle filter.

11. The method according to claim 1, wherein at least one of the $NO_x$ untreated emissions and the feed ratio $\alpha$ is varied by at least 20% during said step of varying.

12. The method according to claim 11, wherein at least one of the $NO_x$ untreated emissions and the feed ratio $\alpha$ is varied by at least 40% during said step of varying.

13. The method according to claim 11, wherein at least one of the $NO_x$ untreated emissions and the feed ratio $\alpha$ is varied by at least 60% during said step of varying.

14. An arrangement for carrying out the method according to claim 1, comprising:
 a particle filter laden with a catalytically active material;
 an NO oxidation catalytic converter mounted upstream of the particle filter;
 a metering device metering a reducing agent upstream of the particle filter,
 wherein loading of the particle filter with the catalytically active material increases from an untreated-gas side towards a clean-gas side of the particle filter, and
 wherein the arrangement is configured to periodically vary an $NH_3$ to $NO_x$ ratio (feed ratio $\alpha$) in phases by changing at least one of the nitrogen oxide ($NO_x$) untreated emissions and the metered amount of reducing agent, in such a way that the feed ratio $\alpha$ periodically alternates in phases between values of greater than one and values of less than one.

15. The arrangement according to claim 14, wherein the loading of the particle filter with the catalytically active material is realized such that an ammonia storage capability of the particle filter laden with the catalytically active catalyst material increases towards the clean-gas side.

16. The method according to claim 1, wherein the step of varying is performed during operation of the internal combustion engine.

17. The method according to claim 1, wherein the step of periodically varying is performed every three seconds.

\* \* \* \* \*